(12) United States Patent
Smith

(10) Patent No.: US 12,708,877 B2
(45) Date of Patent: Aug. 18, 2026

(54) STACKABLE AND ADJUSTABLE MEMBRANE MODULE

(71) Applicant: CrossTek Membrane Technology LLC, Billerica, MA (US)

(72) Inventor: Stanton Russell Smith, Waltham, MA (US)

(73) Assignee: Ultressa LLC, Billerica, MA (US)

( * ) Notice: Subject to any disclaimer, the term of this patent is extended or adjusted under 35 U.S.C. 154(b) by 449 days.

(21) Appl. No.: 18/265,931

(22) PCT Filed: Dec. 10, 2021

(86) PCT No.: PCT/US2021/072857

§ 371 (c)(1),
(2) Date: Jun. 7, 2023

(87) PCT Pub. No.: WO2022/126132

PCT Pub. Date: Jun. 16, 2022

(65) Prior Publication Data

US 2024/0033688 A1 Feb. 1, 2024

Related U.S. Application Data

(60) Provisional application No. 63/199,186, filed on Dec. 11, 2020.

(51) Int. Cl.

*B01D 63/08* (2006.01)
*B01D 63/02* (2006.01)
*B01D 63/10* (2006.01)

(52) U.S. Cl.

CPC .......... *B01D 63/082* (2013.01); *B01D 63/02* (2013.01); *B01D 63/08* (2013.01); *B01D 63/10* (2013.01); *B01D 2313/2011* (2022.08); *B01D 2313/205* (2022.08); *B01D 2313/44* (2013.01); *B01D 2313/54* (2013.01); *B01D 2317/04* (2013.01); *B01D 2319/02* (2013.01)

(58) Field of Classification Search

None

See application file for complete search history.

(56) References Cited

U.S. PATENT DOCUMENTS

2002/0134724 A1 9/2002 Heine et al.
2007/0031954 A1 2/2007 Mairal et al.
2007/0151925 A1 7/2007 De Los Reyes et al.
2011/0192794 A1 8/2011 Chidambaran et al.
2020/0101421 A1 * 4/2020 Abu-Ghdaib .......... B01D 63/14

OTHER PUBLICATIONS

International Search Report and Written Opinion from corresponding PCT Appln. No. PCT/US2021/072857, dated May 6, 2022.

* cited by examiner

*Primary Examiner* — Krishnan S Menon
(74) *Attorney, Agent, or Firm* — Secant IP, PLLC

(57) ABSTRACT

One aspect of the present disclosure is a membrane for water treatment. The membrane preferably includes at least one membrane sub-unit, and at least one membrane cartridge disposed in the at least one membrane sub-unit, the at least one membrane cartridge having a non-cylindrical profile.

23 Claims, 6 Drawing Sheets

100

STACKABLE AND ADJUSTABLE MEMBRANE MODULE

RELATED APPLICATIONS

This application is a U.S. National Stage Application of PCT/US21/72857 filed on Dec. 10, 2021, and claims the benefit of U.S. Provisional App. No. 63/199,186 filed on Dec. 11, 2020, both of which are incorporated in their entireties herein by reference.

TECHNICAL FIELD

This disclosure relates to membrane modules that include one or more removable membrane sub-units that each include one or more removable membrane cartridges. Membrane filtration systems including one or more of such modules and methods of filtering a fluid using such modules are also disclosed.

BACKGROUND INFORMATION

Water and wastewater conditioning or treatment systems are generally designed for a more than 15 year service life. In many cases, water and wastewater treatment demands increase over time for a given operating (thriving) location. Consequently, owners and operators often pre-invest in larger than required facilities when a filtration project is being constructed. Such overdesign can present financial and other challenges—particularly when advanced technologies such as membrane filtration are used. This is because such technologies—though capable of providing more benefit over the long term—are often more capital intensive than other filtration technologies.

Existing membrane technologies can also suffer from integrity breaches, which can lead to portions of the membranes becoming inoperable due to the relatively high level of effluent quality often demanded from these technologies. Such breaches can also reduce the productivity of a membrane plant. These two factors (i.e., cost and integrity breaches) tend to deter the implementation of membrane plants, despite the advantages provided by membrane technology relative to other filtration technologies, e.g., higher effluent quality, smaller footprint, and reduced operator intensity.

BRIEF DESCRIPTION OF THE DRAWINGS

Features and advantages of the following disclosure will be better understood by reading the following detailed description, taken together with the drawings wherein.

Figure 1:
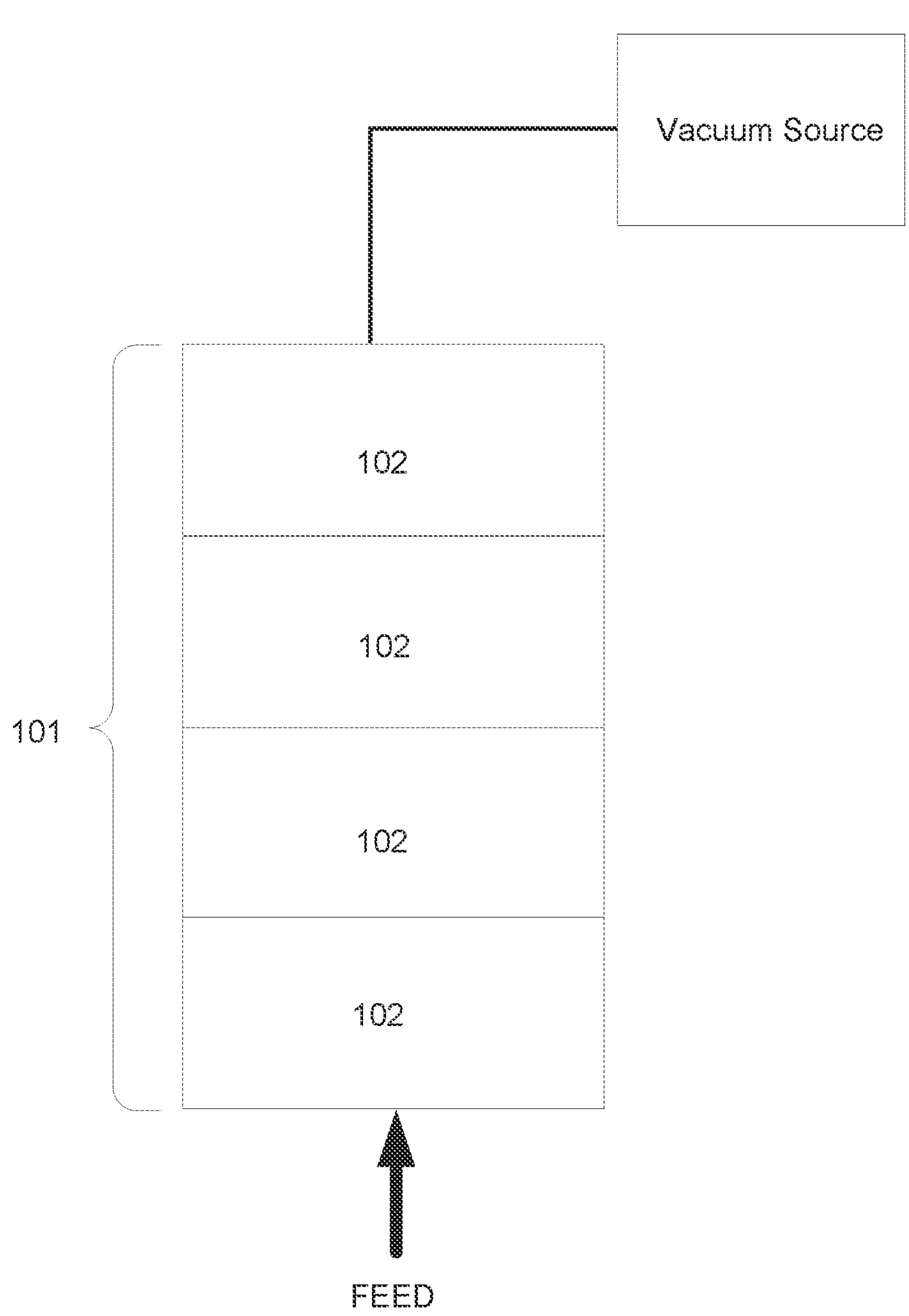
FIG. 1 shows one example of a vacuum filtration system that includes a plurality of membrane modules that each include stackable vacuum filtration membrane sub-units.

The drawings included herewith are for illustrating various examples of articles, methods, and apparatuses of the teaching of the present specification and are not intended to limit the scope of what is taught in any way.

DETAILED DESCRIPTION

As discussed in the background, existing membrane technologies can be capital intensive and suffer from integrity breaches that can deter or limit their use in some applications. As discussed herein, those negative aspects can be mitigated with expandable, adjustable, and repairable membrane treatment system design. However, membrane water and wastewater treatment plants continue to be constructed with membrane modules that have minimal opportunity for repair and/or that use large sub-units that cannot be repaired or replaced individually. Consequently, existing approaches to membrane water and wastewater treatment plants may require the owner or operator to replace an entire building block of a filtration system (e.g., an entire during servicing. For example, an owner or operator of an existing membrane water and/or wastewater treatment plant may need to replace entire membrane modules and their corresponding membrane sub-units during servicing, at significant monetary and labor cost. The owner or operator of an existing membrane water and/or wastewater treatment plant may also need to isolate portions of a membrane system over time (i.e., remove inoperable or poorly functioning membrane elements from the system as their performance deteriorates). Doing so can reduce capacity of the plant as a repair is being made or even reduce the overall capacity of the plant over time. This can frustrate the general aim of providing a treatment plant that can provide increased capacity over time, either through an intentional overbuilding of the plant during construction, or the ability to modify the plant to add additional capacity over time.

For example, an existing membrane filtration plant may utilize spiral-wound membrane modules that can include relatively large membrane cartridges, e.g., cartridges with a minimum dimension of 8×40 inches. When a membrane module in such a plant requires servicing (e.g., due to damage, poor or degraded performance, etc.), it is typically replaced in its entirety, e.g., as a minimum building block. Replacement of such membrane modules is quite costly, particularly when the plant utilizes hollow fiber pressure membrane modules that—for economic reasons—have significantly larger dimensions (e.g., membrane modules with a minimum dimension of 8×80 inches or larger). To limit or extend the time between replacement of damaged or underperforming membrane modules, owners and operators may isolate aged or damaged portions of a hollow fiber pressure membrane module instead of replacing the module in its entirety. However, such action can decrease flow rate through the membrane module (particularly over time) and can hinder or event prevent the membrane filtration plant from achieving a desired level of output/production.

Developments in submerged membrane modules for vacuum filtration (hereinafter, "vacuum filtration modules") have given customers the ability to repair sub-components (i.e., membrane sub-units) of such modules and, in some cases, to obtain increased flow by incrementally adding membrane sub-units to such vacuum filtration modules. More specifically, vacuum filtration modules that include a plurality of stackable membrane sub-units have been developed. The membrane sub-units can be stacked on one another to various heights to form a vacuum filtration module. By adding or subtracting membrane sub-units, the height and capacity of the vacuum filtration module can be customized as demand increases or decreases over time. As a result, smaller vacuum filtration modules can be initially used at the time of plant construction (reducing the initial capital cost associated with such membranes), and then later expanded with additional membrane sub-units as demand increases. However, the savings achieved by using smaller vacuum filtration modules initially may be offset by the need to build deeper submersible basins that can accommodate the larger physical size of the vacuum filtration modules when they are expanded with additional membrane sub-units.

Plant users/owners can also modify an existing vacuum plant by replacing existing hollow fiber membrane modules with vacuum filtration modules. This may be done, for example, by utilizing the flexible arrangement of the stackable membrane sub-units to fit a vacuum filtration module into a plant's existing membrane tanks—which are often permanent concrete construction. A user/owner of a vacuum plant may thus obtain the improved performance of vacuum filtration modules (relative to hollow fiber membrane modules) without needing to remodel the plant's membrane tanks. As such, vacuum filtration modules can provide several advantages to vacuum plant owners and operators relative to the use of hollow fiber membrane modules. As one example of such a system reference is made to FIG. 1, which depicts a vacuum filtration system 100 that includes a plurality of vacuum membrane filtration modules 101. As shown, each vacuum filtration module 101 includes a plurality of stackable vacuum filtration sub-units 102. As may be appreciated, the size of each vacuum filtration module may be adjusted by adding or reducing vacuum filtration sub-units 102, e.g., to achieve a desired level of water treatment capacity. In general, more vacuum filtration sub-units 102 translates to more water treatment capacity, and fewer vacuum filtration sub-units 102 translates to less water treatment capacity.

While existing vacuum filtration modules such as vacuum filtration modules 101 are useful, they are not without limitations. For example, existing vacuum filtration modules (e.g., those produced by CERAFILTEC® and ItN) include membrane sub-units that are not pressure holding. In particular, such membrane sub-units lack a pressure housing that would allow them to hold pressure, e.g., a pumped feed application. Consequently, such vacuum filtration modules may be unsuitable for some applications, such as filtration applications in which feed is pumped through the filter membrane module as opposed to being drawn through it by a vacuum.

With the foregoing in mind, aspects of the present disclosure relate to membrane modules that include at least one membrane sub-unit. One or a plurality of stacked filter sub-units can be coupled to one another to form a membrane module (e.g., a submerged membrane module). As will become evident from the following description, the membrane sub-units described herein can be self-contained, adjustable, and repairable without the need to replace the entire membrane module, and/or without the need to isolate a portion of the membrane module as discussed above. Preferably, the membrane modules consistent with the present disclosure includes a pressure housing. The pressure housing is preferably configured to operate at pressures in a range of 1 to 3 pounds per square inch of gauge pressure (psig), 2 to 15 psig, or at least 30 psig. In embodiments, the pressure housing is formed at least in part by the housing of adjacent and coupled membrane sub-units.

Figure 5:
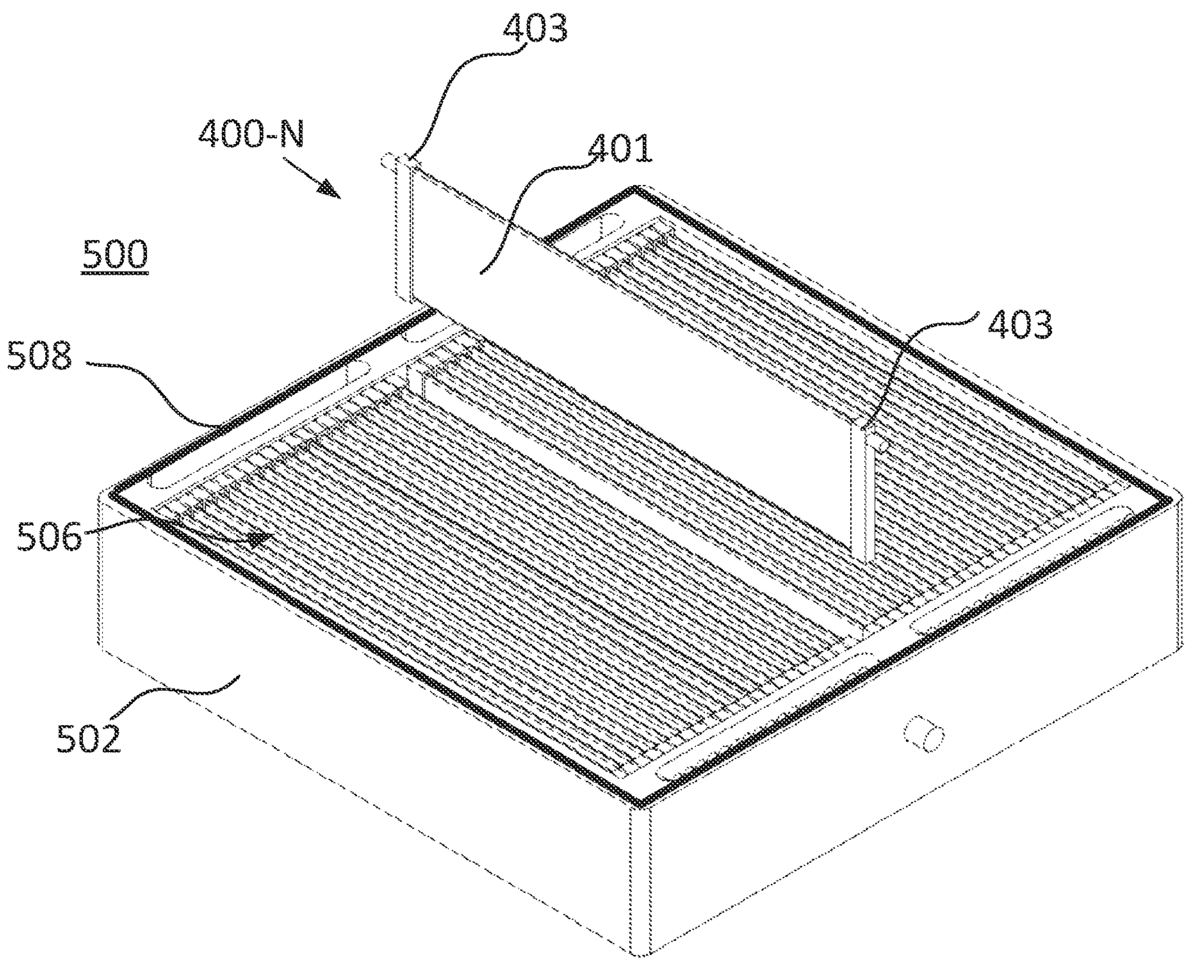
FIG. 5 shows one example of a membrane sub-module consistent with the present disclosure.

To provide flexibility while maintaining the features of access and scalability of system size and expansion to meet future needs, each of the membrane sub-units described herein preferably include a pressure-holding wall and at least one seal, which may be integrated into the membrane sub-unit. For example, and as shown in FIG. 5, a membrane sub-unit 500 may include a housing 502 that includes at least one wall that defines a cavity 506 for receiving one or a plurality of filter cartridges 400-N as described later. The at least one wall may have an upper surface and a lower surface. In such instances, the membrane sub-module may include a sealing 508 that is integral with or coupled to the upper surface of the at least one wall. When first and second membrane sub-units $\mathbf{500}_1$, $\mathbf{500}_2$ are coupled to each other, the seal 508 of the first sub-unit $\mathbf{500}_1$ may be compressed between the upper surface of the wall of the first sub-unit $\mathbf{500}_1$ and the lower surface of the wall of the second membrane sub-unit $\mathbf{500}_2$, forming a pressure seal between the first and second sub-units $\mathbf{500}_1$, $\mathbf{500}_2$. In any case, the membrane sub-units described herein may also include a pressure inlet and a pressure outlet (shown as inlet 301 and outlet 303 in FIG. 3) for encapsulating the feed pressure, and which may also be integrated into the housing 502.

One aim of the present disclosure is to provide such integrated pressure seals without substantial added cost and complexity as this would frustrate the purpose of easing initial capital expense associated with reparability and expandability, and thus, continued adoption of such filter membrane technologies.

The membrane modules described herein differ significantly from current commercial pressure membrane modules. For example, existing pressure filtration systems may include modules that include hollow fiber membranes. Hollow fiber membranes have been deployed over the last three decades, and are particularly well suited for producing large, single membrane cartridge membrane modules with ever-increasing dimensions, e.g., 8×80 inch diameter and larger. System designers can take use such relatively large, single cartridge membrane modules to reduce capital cost, and to provide other benefits. For example, a system designer may reduce/mitigate the risk of loss of a large single membrane module by enabling damaged portions or the membrane module to be isolated, e.g., as it ages. While this approach is useful, it is losing its appeal in the market due to the frequency, effort, repair cost, and loss of productivity that is incurred when portions of the membrane module are isolated. These drawbacks are particularly problematic for drinking water plants and other operations that require high levels of integrity of the membrane modules.

Existing reverse osmosis plants often use large vessels, e.g., 22 foot long vessels with an 8 inch diameter to enclose six (6) 8×40 inch membrane cartridges. While such cartridges are approximately half the size of commercial hollow fiber membrane modules, they are not repairable. The use of a fixed size large vessel at the start of the project build is also a disadvantage from a capital cost standpoint as it pertains to expandability. This is because upfront capital spending is needed to construct such vessels and the system that holds them in a way that allows for future expansion, e.g., by including piping for new vessels and/or partially filled vessels at the time of construction to plan for future expansion.

Other technology offerings appear to allow for smaller membrane cartridges/modules and even potential repair to existing cartridges/modules without production loss. Like existing reverse osmosis products, however, such technologies can necessitate the use of relatively large vessels to enclose the cartridges/modules and lead to the same issues that reverse osmosis products face. For example, existing reverse osmosis products can require fixed-dimension pressure containers to enclose sub-units within the cartridges/modules. As a result, modifying the number of sub-units within a membrane module/cartridge of a reverse osmosis system does not result in modifying the membrane module geometry. Thus, the ability to easily expand or shrink a reverse osmosis system to meet target production at a later point in time is generally impractical due to cost and complexity of in-place upgrades/changes.

One aim of the present disclosure is to provide repairability and expandability of pressure membrane modules to reduce the cost of system expandability either upfront or when needed in the later part of a product or project life. In addition, the present disclosure aims to provide membrane modules that allow for repair without loss of productivity with ease of repair being both easy/simple due, for instance, to the use of stackable membrane sub-units. Likewise, membrane modules consistent with the present disclosure aim to be relatively low cost due, at least in part, to the relatively small cost associated with switching out the small basic building block (i.e., one or more sub-units) rather than an entire spiral wound membrane module as discussed above, for example. Thus, aspects of the present disclosure can provide building blocks of a membrane filtration system at a relatively small sub-unit level rather than at an entire membrane module level.

Another aim of the present disclosure is to provide a membrane module for water and wastewater treatment, with the ability to operate in pressure, vacuum and the combination thereof, i.e., hybrid driving forces.

The membrane modules described herein can also differ from existing vacuum filtration membrane modules in that they include membrane sub-units that include an integral pressure case/housing. This can provide numerous benefits, such as increased ease of access, simplified expansion, simplified repair, and/or simplified modification.

Figure 4:
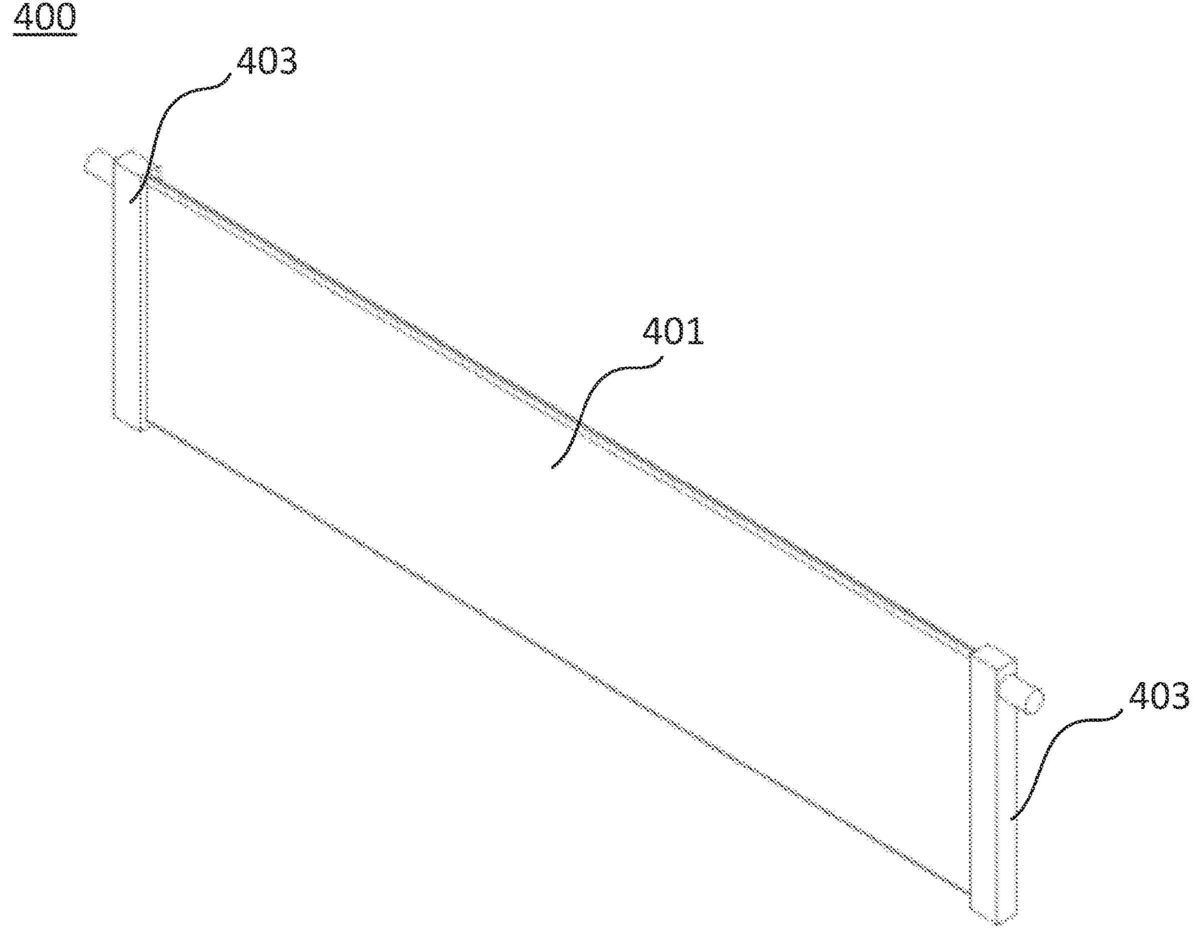
FIG. 4 shows one example of a membrane cartridge consistent with the present disclosure.

In one preferred example, a membrane module (or, more particularly, a membrane sub-unit of a membrane module) consistent with the present disclosure includes multiple membrane cartridges, and more preferably a plurality of non-cylindrical membrane cartridges. In embodiments the membrane cartridges described herein have a rectangular shape and, more preferably, have a rectangular prism profile having a plurality of facets/faces. FIG. 4 depicts one example of a suitable membrane cartridge 400 that can be used in the membrane modules and membrane sub-units described herein. In this embodiment membrane cartridge 400 includes a membrane 401 that has a rectangular profile. In embodiments the membrane 401 is formed from ceramic, but any suitable material may be used to form membrane 401. Moreover, the membrane 401 may have any other suitable shape, such as a 3, 4, 5, 6, or more sided shape, an irregular shape, or a combination thereof. The surface of membrane 401 can be planar or non-planar. Regardless of its shape, membrane 401 is coupled to a frame 403 that is configured to mount within a cavity of a membrane sub-unit consistent with the present disclosure.

FIG. 5 illustrates one example of a membrane sub-unit 500 (which may also be referred to as a membrane sub-module) consistent with the present disclosure. As shown, membrane sub-unit 500 includes a housing 502 that includes at least one wall. The at least one wall of the housing 502 defines a cavity 506, which is configured to receive a plurality of membrane cartridges 400-N, where N is an integer greater than or equal to 1. The number of membrane cartridges 400-N included in membrane sub-unit is not limited, and any suitable number of membrane cartridges 400-N may be used. Without limitation, membrane cartridges 400-N preferably include a rectangular shaped membrane 401, but as noted above any suitable membrane shape may be used. In any case, each membrane cartridge 400-N is preferably configured such that it can be disposed within a cavity 506 defined by at least one wall of a housing 502 of membrane sub-unit 500. For example, and as shown in FIG. 5, frame 403 may include one or more posts (not labeled) that are receivable within a slot within housing 502, thereby mounting a membrane sub-unit 400-N in cavity 506.

Figure 2:
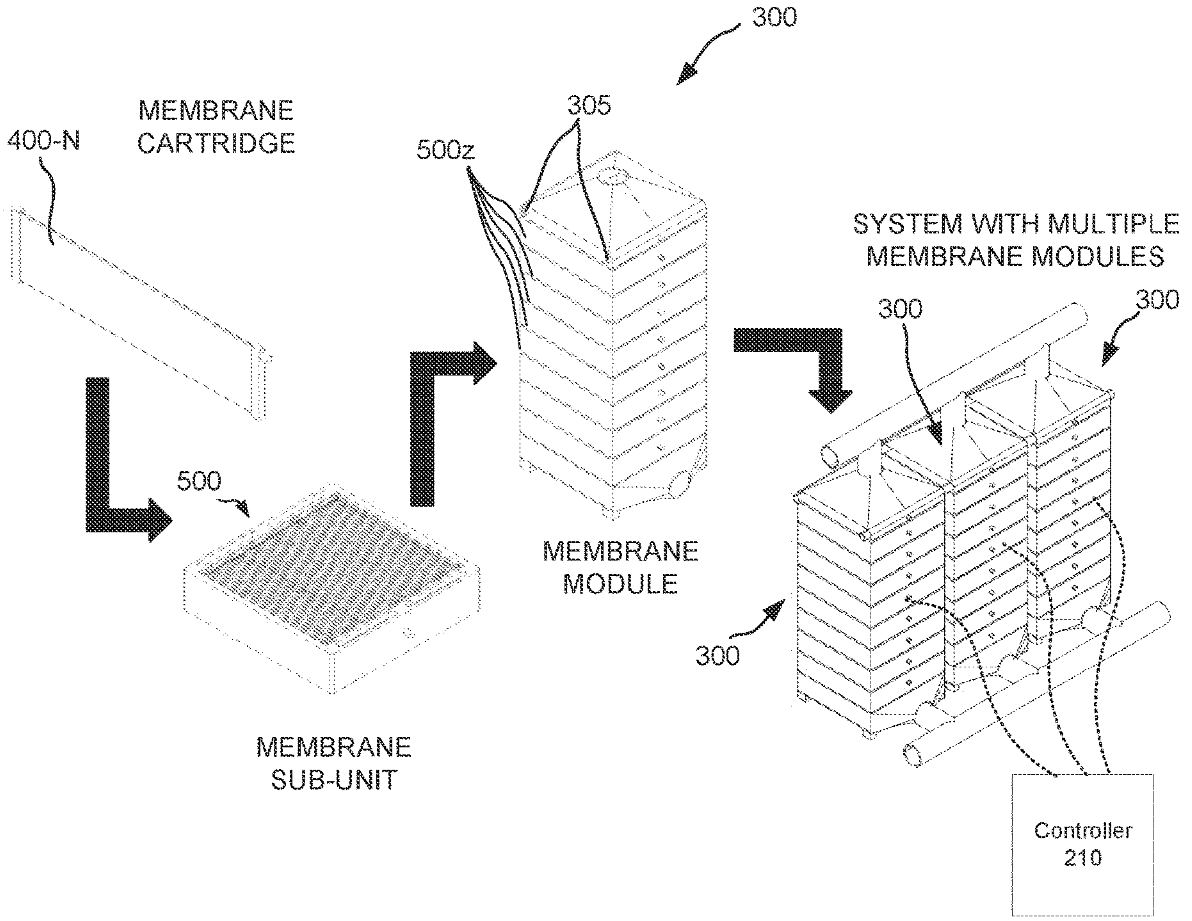
FIG. 2 shows examples of a membrane cartridge, membrane sub-unit, membrane module, and system including multiple membrane modules consistent with the present disclosure.
Figure 3:
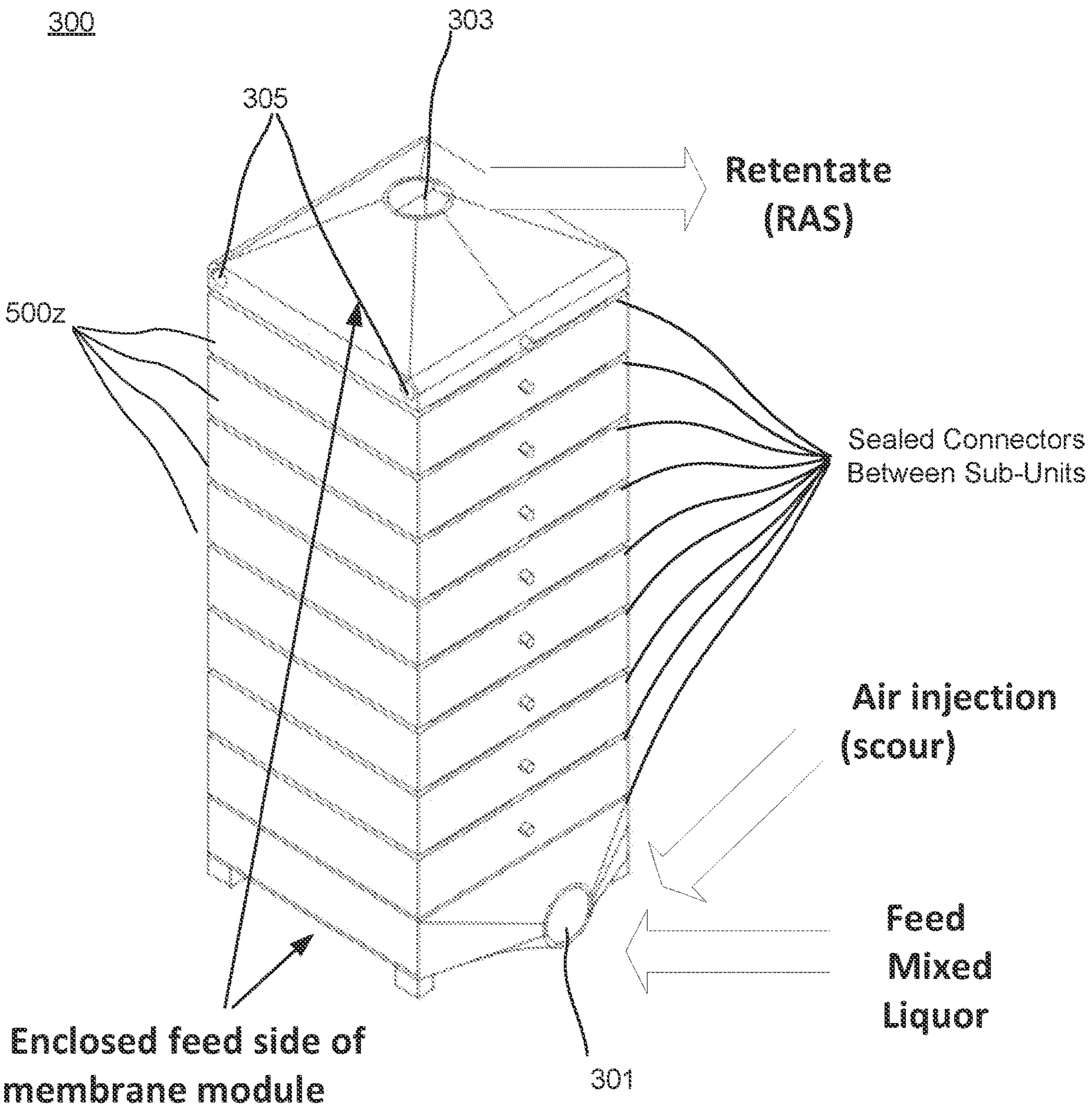
FIG. 3 depicts one example of a membrane module including a plurality of membrane sub-modules, consistent with the present disclosure.

The feed side of the sub-unit 500 is preferably sealed when multiple membrane sub-units 500 are coupled to one another in a "stacked" configuration, e.g., as best shown in FIG. 3. Thus, the cavity 506 of the sub-module 500 forms part of a pressure housing preferably only when a sub-module 500 is coupled to one or more additional sub-modules 500 consistent with the present disclosure. A plurality of such stacked sub-modules then can collectively provide a membrane module 300 as shown in FIGS. 2 and 3.

Put differently, the membrane modules described herein may include at least a first sub-unit $\mathbf{500}_1$ and a second sub-unit $\mathbf{500}_2$, wherein the first and second sub-units $\mathbf{500}_1$, $\mathbf{500}_2$ include respective first and second housings $\mathbf{502}_1$, $\mathbf{502}_2$. The first and second housings $\mathbf{502}_1$, $\mathbf{502}_2$ may include respective first and second wall(s) that define respective first and second cavities $\mathbf{506}_1$, $\mathbf{506}_2$ that are each configured to respectively receive one or more membrane cartridges 400-N. The first wall(s) of the first housing $\mathbf{502}_1$ may include an upper surface and the second wall(s) of the second housing $\mathbf{502}_2$ may include a lower surface. The second sub-unit $\mathbf{500}_2$ may be stacked on the first sub-unit $\mathbf{500}_1$ such that the lower surface of the second wall(s) of the second housing $\mathbf{502}_2$ contacts the upper surface of the first wall(s) of the first housing $\mathbf{502}_1$. When the second sub-unit $\mathbf{500}_2$ is stacked on the first sub-unit $\mathbf{500}_1$ in that manner, a pressure seal may be formed at an interface between the upper surface of the first wall(s) of the first housing and the lower surface of the second wall(s) of the second housing. The pressure seal may be formed by integral components of the first and second housings $\mathbf{502}_1$, $\mathbf{502}_2$, e.g., by sealed connectors as shown in FIG. 3 and/or seals 508 as shown in FIG. 5. Alternatively, or additionally, the seal between the first and second membrane sub-units $\mathbf{500}_1$, $\mathbf{500}_2$ may be facilitated by one or more sealing elements (e.g., an O-ring or other elastomeric seal) at the interface between the first and second housings. These concepts are illustrated in FIGS. 2 and 3, which show a plurality of membrane sub-units 500*z* (z—being an integer greater than or equal to 1) which are stacked to form a membrane module. As best shown in FIG. 3, a pressure seal is formed at the interface between each adjacent sub-unit 500*z*.

The present disclosure has identified that a membrane module consistent with the present disclosure can utilize combined air scour and biomass pumping to reduce the energy use of the membrane module during operation, and thus by extension the overall energy consumption of a membrane treatment plant versus existing approaches of submerged membrane applications.

Figure 6:
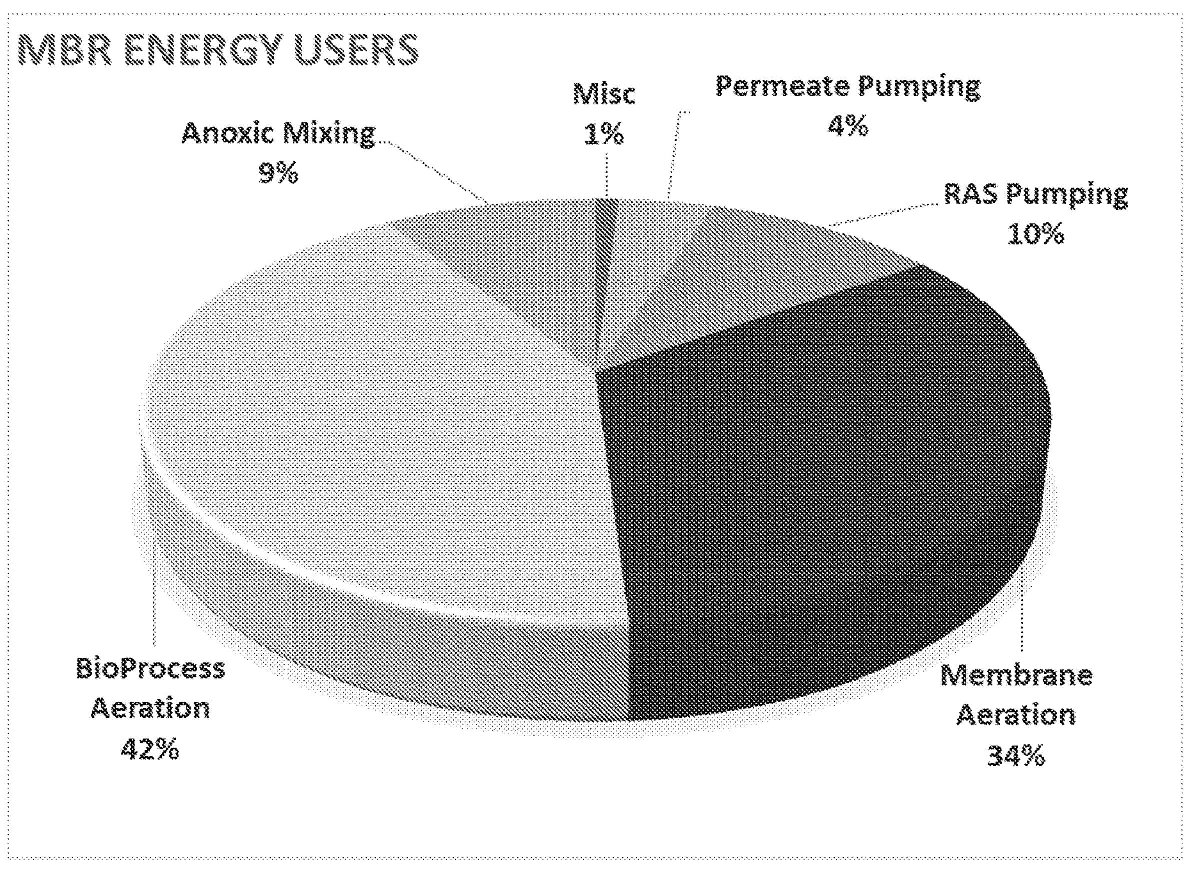
FIG. 6 is a pie chart illustrating that recycled activated sludge (RAS) pumping and membrane aeration can account for about 48% of the total power consumption of a filter system.

'Membrane bioreactor' (MBR) refers to a wastewater treatment process where a perm-selective membrane, e.g., microfiltration or ultrafiltration, is integrated with a biological process, e.g., a suspended growth bioreactor. Bioprocess aeration is closely related with wastewater characteristics and is largely independent of the membrane module selected, likewise for anoxic mixing. The permeate pumping, recycled activated sludge (RAS) pumping and membrane aeration are directly related to the membrane module design and can account for about 48% of the total power consumption of an MBR process as shown in FIG. 6.

As may be appreciated from the foregoing, the membrane modules described herein utilize a field-erected and adaptable membrane design that can adjust to the changing needs of a system and/or can be easily maintained in the field by the addition or subtraction of membrane sub-units.

In one preferred example, an adjustable membrane module and system implementing the same is disclosed. The adjustable membrane module, which may also be referred to herein as a membrane module, preferably includes a plurality of membrane sub-units 500. When the plurality of membrane sub-units 500*z* are coupled together (e.g., as shown in FIGS. 2 and 3), the outermost walls of each of the membrane sub-units 500*z* collectively form a feed side pressure holding container. That is, each membrane sub-unit 500 defines at least a portion of the pressure holding container (also referred to as a pressure housing) of the membrane module. More specifically, in embodiments the housing of each of the membrane sub-units 500 forms part of the pressure holding container of the membrane module. In that way, at least a portion of the pressure holding container of the membrane module is integral with each membrane sub-unit 500. This is unlike other stackable MBR membrane sub-units, which do not hold pressure on the feed side (but which may hold pressure on the permeate side (shown in FIGS. 2 and 3 as permeate side 305) and largely stack for reduced footprint and to have reduced air flow for air scour using taller stacks.

Preferably, the permeate side of the membrane sub-units 500 disclosed herein also can also be configured to hold pressure when they are coupled with other membrane sub-units. Alternatively, or additionally, the permeate side of the membrane sub-units 500 can also be interconnected after stacking.

The membrane modules and membrane sub-units consistent with the present disclosure are preferably designed such that the membrane sub-units can be easily installed into or removed from the membrane module. In that way, the number of membrane sub-units per membrane module can be easily altered throughout the operational lifespan of the membrane module. That is, the membrane modules described herein may be configured such that membrane sub-units may be added, removed, and/or replaced during the operational lifespan of the membrane module.

In embodiments the membrane sub-units 500 described herein preferably contain at least one membrane cartridge 400-N that is a core/main component that serves to purify the feed by retaining contaminants from the feed and passing purified feed through the membrane to produce membrane permeate. Such membrane cartridges 400-N preferably operate in an outside-to-in filtration mode with the feed stream on the outside of the surface of the membrane cartridge surface. That is, the membrane cartridges 400-N are preferably configured such that the feed stream is between the membrane surface and a pressure-holding wall of the membrane sub-unit housing 502, i.e., the same wall(s) that (upon connecting to corresponding wall(s) of an adjacent membrane sub-unit) form part of the pressure holding container of the membrane module.

In embodiments, the membrane cartridges 400-N are sealed inside the membrane sub-unit 500 such that the feed and membrane permeate are always separated by a membrane filtration layer.

In embodiments the membrane cartridges 400-N preferably include at least one ceramic flat plate membrane. In any case, the membrane cartridges 400-N can operate with pressure, vacuum or both pressure and vacuum as driving forces for the membrane filtration. Multiple membrane modules consistent with the present disclosure can be arranged in series, parallel, or series-parallel to form a treatment system depending on a desired configuration and performance.

Another preferred example of the present disclosure includes an energy saving membrane process using a system that includes one or more membrane modules consistent with the present disclosure to filter feed from a membrane bioreactor. The membrane module(s) each include a plurality of stacked membrane sub-units 500, each of which includes a plurality of membrane cartridges 400-N (e.g., flat ceramic membranes). During the process, feed in the form of mixed liquor from the membrane bioreactor is pumped (e.g., by pressure) through the membrane module to generate crossflow in the membrane module. Air scour may then be preferably introduced into the mixed liquor entering the membrane module to assist with improving the turbulence inside the membrane module and enhance flux. After biomass-free membrane permeate is removed from the feed mixed liquor by the membrane module, the retentate (i.e., the retained, now more concentrated biomass) exiting the membrane module is preferably circulated back to the membrane bioreactor. The retentate may undergo air-water separation prior to being recycled—with the air fraction retained under pressure and used for aerating the membrane bioreactor, and the water phase recycled to the membrane bioreactor.

Notably, this process can filter the feed at reduced power consumption and/or membrane fouling, relative to filtering of the feed with a traditional vacuum membrane system. Moreover, an existing vacuum membrane system—because it does not have an enclosed pressure casing—does not have the ability to combine mixed liquor pumping and air scour in the membrane feed. Rather, such vacuum membrane systems use only air scour to induce water flow in the non-pressure holding submerged membrane module, while pumping biomass separately in a pressure pipe.

Due to the combination of air scour plus pumping (enabled by the pressure casing formed by the housing of multiple membrane sub-units consistent with the present disclosure), aspects of the present disclosure can provide additional benefits, e.g., by combining aspects of a biological process design with a membrane module (and/or system comprising one or more membrane modules) consistent with the present disclosure. For example, if a higher biological recycle rate is targeted for achieving bioprocess goals such as achieving low membrane permeate nitrogen, the recycle flow being directed through the membrane module can enable reduced air scour injection. This can result in significant power savings since air scour in a vacuum membrane system can account for 35% or more of the total power cost of a municipal biological treatment process. In contrast, biomass pumping generally accounts for about 10% of the total power cost in standard bioprocessing. Biomass pumping equipment may also be more efficient (e.g., about 20% more efficient) than air pressurization equipment used to generate air scour. In any case, while the systems, modules, and sub-units described herein are preferably used in a pressure mode, they can also be used in vacuum mode or a hybrid (vacuum and pressure) mode. They can also be used for new builds, retrofits for existing builds, and/or expansions of existing facilities.

Consistent with the above disclosure, in embodiments membrane module 300 may preferably include a plurality of membrane sub-units 500*z* that can be arranged in (direct) contact with each other such that the outer walls of the housing 502 of each sub-unit 500*z* forms at least part of the pressure-bearing outer wall of the membrane module. In such embodiments no additional membrane module wall (i.e., no separate pressure housing) is necessary for the membrane module 300 to contain pressure. Moreover, the size (dimensions) of the membrane modules described herein is not fixed, and can vary based on the number of membrane sub-units 500 employed. The size of the membrane modules described herein may also be altered throughout the lifetime of the membrane module, e.g., by simply adding or removing membrane sub-units 500. Similarly, the membrane sub-units described herein can be sized differently. In embodiments the membrane modules described herein include a plurality of sub-units, wherein each of the sub-units is the same size. In alternative embodiments, the membrane modules described herein may include a plurality of sub-units, wherein at least one of the plurality of sub-units has a first size that differs from a second size of another of the plurality of sub-units.

As noted above, the housing 502 of each membrane sub-unit 500 can form part of a pressure barrier of a membrane module when it is coupled with an adjacent membrane sub-unit 500. One or more of the membrane sub-units 500 described herein may also include or be coupled to an inlet and an outlet to form a fully sealed flow path. The flow path can be partially opened to allow partial flow through the otherwise sealed wall(s) of the housing 502, e.g., at a side, a top, or a bottom of a membrane sub-module 500. Alternatively, or additionally, the flow path may be configured to allow pumped fluid to circulate inside the membrane module and/or inside a membrane tank in which the membrane module is installed. The seal between adjacent membrane sub-modules 500*z* is preferably configured to withstand at least 1 psig of pressure, greater than or equal to 2 psig, greater than or equal to 5 psig, greater than or equal to about 15 psig of pressure, or even greater than or equal to 30 psig of pressure.

The membrane 401 preferably includes an active membrane surface that is oriented to face the exterior of membrane cartridge 400-N. This allows the membrane cartridge 400-N to operate in an outside-to-in production mode. In that mode the feed fluid to be filtered contacts the active membrane surface on the outside of the membrane cartridge 400-N. A portion of the feed fluid (the permeate) passes through the membrane surface into the inside of the membrane cartridge 400-N and behind the membrane 401. The permeate (or product) then flows to one or more product collection zone (not labeled) in the membrane cartridge 401.

The collection zone(s) of the membrane cartridge 401 is (are) preferably fluidly connected to one or more collection zone(s) (not labeled) of the membrane sub-unit 500. The collection zone(s) of the membrane sub-unit 500 in turn is (are) fluidly connected to one or more collection zone(s) (not labeled) of the membrane module 300. The collection zone(s) in the membrane sub-unit 500 is (are) preferably able to operate with N membrane cartridges in each membrane sub-unit 500 to allow for system adjustment as needed. Likewise, the collection zone(s) in membrane module 300 can preferably operate with an adjustable number of membrane sub-units 500. As a result, the design of membrane module 300 may remain flexible over its operating life.

Permeate production through the membrane cartridge 401 is driven preferably by a vacuum, by pressure driving forces, or a combination of both vacuum and pressure (i.e., a hybrid approach). Preferably the membrane modules described herein are operated with higher pressure on the feed side of the membrane cartridge and the lower pressure on the permeate side of the membrane cartridge 400-N, such that feed is driven through the membrane 401 via pressure.

The membrane cartridge(s) 400-N described herein are preferably placed into a membrane sub-unit 500 consistent with the present disclosure in a manner that is reversible and adjustable in spacing and orientation over the product life. In that regard and as noted above, the membrane cartridges 400-N may each include a frame 403 that is configured to couple to membrane 401 and to facilitate placement of the membrane cartridge into a cavity 506 of a membrane sub-unit 500. In embodiments, the membrane cartridges 400-N are preferably independently sealed and, as such, can produce effluent independently outside of the membrane sub-unit 500, e.g., by applying vacuum to their collection zone(s).

Membrane cartridges consistent with the present disclosure do not necessarily need feed spacers for sealing and are preferably able to operate with the feed flow path between the membrane cartridges being free from added feed spacer material placed between the membrane cartridges. Feed spacers can be optionally added for turbulence promotion or other operation purposes as desired.

The bottom or top of the membrane modules (or of the membrane sub-units) described herein can include any or a combination of the following features: pumping under pressure through the membrane module, gas injection that travels through the membrane module, sponge balls or other physical membrane cleaning and hydraulic enhancement methods to be used to improve performance of the membrane module, chemical injection, and instruments for measurement of performance, such as flow, pressure, temperature, water quality. For example, The product or permeate side of the membrane (or of the membrane sub-unit) can include any one or a combination of the following features including pumping under pressure through the membrane module for example, to produce hydraulic cleaning, gas injection that can serve to detect leaks or integrity of the membrane cartridges, chemical injection, and instruments for measurement of performance, such as flow, pressure, temperature, water quality.

Multiple membrane modules can be arranged in a membrane system in series and/or parallel, above ground or below ground, submerged in the feed to be treated with the membrane or have the feed contained inside the membrane module under pressure, and/or replace old membranes in existing systems whether pressure or vacuum driven.

Membrane module instrumentation can be employed to adjust hydraulic and chemical cleaning of a membrane module based on actual performance versus target performance so as to improve the performance of the membrane system throughout its life. Instrumentation can also be used to adjust the membrane cartridge type and count in each membrane sub-unit. For example, and as shown in FIG. 2, the systems described herein may include a controller 210 that is configured to monitor process conditions within one or a plurality of membrane modules 300. For example, membrane modules 300 may include one or more sensors (e.g., integral with or coupled to one or more membrane sub-units 500) that are configured to monitor process conditions such as temperature, pressure, flow rate, solids content, feed composition, permeate composition, combinations thereof, and the like. The sensor(s) may provide one or more sensor signals to controller 210, wherein the sensor signals are indicative of one or more detected process conditions. Controller 210 may be configured to determine the process conditions from the sensor signal, and control one or more process parameters (e.g., feed flow rate, temperature, pressure, combinations thereof, and the like) to obtain desired performance from the system. Likewise, the sensors may provide a sensor signal to controller 210 that is indicative of the number of membrane sub-units 500*z* within a membrane module 300. In such instances, controller 210 may adjust one or more process conditions based on the number of membrane sub-units 500*z* in order to achieve desired performance from the system.

As described above, FIG. 2 illustrates an embodiment of the present disclosure in which a plurality of membrane sub-units 500*z* are stacked to form a membrane module 300, with the housing 502 of the membrane sub-units 500*z* forming a pressure housing for the membrane module 300. In the illustrated embodiment the membrane sub-units 500 are shown coupled in series with one another, but the sub-units may also be coupled in parallel. Likewise, a plurality of membrane modules 300 may be coupled in series or in parallel, depending on desired system performance.

The membrane modules described herein may also include optional flow directing baffles. When used, such baffles may be configured to increase crossflow rate in a membrane module by directing flow along certain reduced cross-sectional area and longer flow paths to enhanced surface shear of at the membrane active surface to enhance mass transfer.

In embodiments, the membrane modules described herein include at least one removable membrane sub-unit 500*z* that includes at least one membrane cartridge 400-N that includes a membrane 401, wherein the membrane 401 includes or is formed from one or more ceramic or polymeric hollow fiber membranes; cast, extruded, electrospun or other non-bonded flat plate membranes of ceramic or polymeric membrane materials; and/or other membrane shapes and materials arranged in an outside-to-in filtration mode.

As noted above, the membrane modules described herein do not necessarily require additional feed spacer materials to create feed flow channels for the feed which is preferably located on the outside of the active membrane surface. In specific non-limiting embodiments, the membrane modules described herein do not include feed spacer materials and include a plurality of membrane sub-units 400-N, wherein the housing of the plurality of membrane sub-units 400-N together form a pressure housing that is able withstand at least 1 psi pressure, in the range of 2 psig to 15 psig, and more preferably over 30 psig. In such embodiments the membrane sub-units 400-N are preferably non-cylindrical in shape, and the membrane module(s) can be operated in a vacuum, pressure, or hybrid production mode. In embodiments, the membrane modules include one or more membrane sub-units, wherein each of the membrane sub-units is preferably configured such that it is hydraulically uniform. Hydraulic uniformity between two different membrane sub-units in a membrane module is not required, however, and in embodiments the membrane modules may include a first membrane sub-unit and a second membrane sub-unit, wherein the first and second membrane sub-units differ hydraulically from each other.

One aim of the present disclosure includes providing pressurized modules rather than open/vacuum driven modules (See FIG. 3).

The present disclosure is equally applicable to other filtration processes and not just biological wastewater treatment. One example includes water treatment applications, where air scour is used intermittently, or not at all.

The membrane modules of the present disclosure can be incorporated into applications and be used as crossflow, dead-ended, with and without backwash, with and without air scour, and/or with and without biological pre-treatment to avoid use limitations.

One aspect of the present disclosure is a membrane module that comprises at least one membrane sub-unit, and at least one membrane cartridge disposed in the at least one membrane sub-unit, the at least one membrane cartridge having a non-cylindrical profile.

Another aspect of the present disclosure includes a membrane module comprising a plurality of removable membrane sub-units that are coupled to each other to form a pressure housing.

Another aspect of the present disclosure is a system comprising at least first and second membrane modules, each of the first and second membrane modules comprising, at least first and second membrane sub-units configured to couple to each other and form a pressure holding feed container, and wherein the first and second membrane modules are fluidly coupled to each other in series or in parallel.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A membrane module comprising:

a plurality of membrane sub-units configured to be removably coupled together to form at least a portion of a pressure housing of the membrane module, the pressure housing including an inlet and an outlet and defining an exterior surface of the membrane module, wherein the plurality of membrane sub-units include a first membrane sub-unit and a second membrane sub-unit;

a first membrane cartridge removably disposed in a first cavity defined by the first membrane sub-unit, the first membrane cartridge having a non-cylindrical profile; and a second membrane cartridge removably disposed in a second cavity defined by the second membrane sub-unit, the second membrane cartridge having a non-cylindrical profile.

2. The membrane module of claim 1, wherein the plurality of membrane sub-units further includes a third membrane sub-unit disposed between the first membrane sub-unit and the second membrane sub-unit, wherein the membrane module further comprises a third membrane cartridge configured to be removably disposed in a third cavity defined by the third membrane sub-unit, the third membrane cartridge having a non-cylindrical profile.

3. The membrane module of claim 1, wherein the second membrane sub-unit is stacked on the first membrane sub-unit.

4. The membrane module of claim 1, wherein:

the first and second membrane sub-units each include a permeate side and a feed side; and the first and second membrane sub-units are coupled to each other via at least their respective feed sides.

5. The membrane module of claim 1, wherein the pressure housing is configured to withstand at least 1 pound per square inch of gauge pressure (psig).

6. The membrane module of claim 5, wherein the pressure housing is configured to withstand at least 5 pounds per square inch of gauge pressure (psig).

7. The membrane module of claim 6, wherein the pressure housing is configured to withstand at least 30 pounds per square inch of gauge pressure (psig).

8. The membrane module of claim 6, wherein the membrane module is configured to be removably installed in a membrane filtration system.

9. A system comprising:

a first membrane module comprising:

a pressure housing, the pressure housing defining an exterior surface of the first membrane module and including an inlet configured to be fluidly coupled to a source of feed to be filtered by the system and an outlet;

a first membrane sub-unit defining a first cavity configured to removably receive a first plurality of membrane cartridges, the first plurality of membrane cartridges having a non-cylindrical profile; and a second membrane sub-unit defining a second cavity configured to removably receive a second plurality of membrane cartridges, the second plurality of membrane cartridges having a non-cylindrical profile;

wherein the first membrane sub-unit and the second membrane sub-unit are configured to be removably coupled together to define at least a portion of the pressure housing.

10. The system of claim 9, wherein:

the first membrane module further comprises a third membrane sub-unit disposed between the first membrane sub-unit and the second membrane sub-unit, the third membrane sub-unit defining a third cavity configured to removable receive a third plurality of membrane cartridges, the third plurality of membrane cartridges having a non-cylindrical profile.

11. The system of claim 9, wherein:

the first and second membrane sub-units each include a permeate side and a feed side; and the first and second membrane sub-units are coupled to each other via at least their respective feed sides.

12. The system of claim 9, wherein the pressure housing is configured to withstand at least 1 pound per square inch of gauge pressure (psig).

13. The system of claim 12, wherein the pressure housing is configured to withstand at least 5 pounds per square inch of gauge pressure (psig).

14. The system of claim 9, further comprising a second membrane module, wherein the first and second membrane modules are coupled in series.

15. The membrane module of claim 1, further comprising one or more seals between adjacent membrane sub-units of the plurality of membrane sub-units.

16. The membrane module of claim 1, wherein the first membrane sub-unit includes the inlet of the pressure housing and wherein the second membrane sub-unit includes the outlet of the pressure housing.

17. The system of claim 9, further comprising a seal between the first membrane sub-unit and the second membrane sub-unit.

18. The system of claim 9, wherein the first membrane sub-unit includes the inlet of the pressure housing and wherein the second membrane sub-unit includes the outlet of the pressure housing.

19. The system of claim 9, further comprising a second membrane module, wherein the first and second membrane modules are coupled in parallel.

20. The system of claim 9, further comprising the first plurality of membrane cartridges.

21. The system of claim 20, further comprising the second plurality of membrane cartridges.

22. The system of claim 14, wherein the second membrane module comprises:

a second pressure housing, the second pressure housing defining a second exterior surface of the second membrane module and including a second inlet configured to be fluidly coupled to an outlet of the first membrane module and a second outlet;

a fourth membrane sub-unit defining a fourth cavity configured to removably receive a fourth plurality of membrane cartridges, the fourth plurality of membrane cartridges having a non-cylindrical profile; and a fifth membrane sub-unit defining a fifth cavity configured to removably receive a fifth plurality of membrane cartridges, the fifth plurality of membrane cartridges having a non-cylindrical profile;

wherein the fourth membrane sub-unit and the fifth membrane sub-unit are configured to be removably coupled together to define at least a portion of the second pressure housing.

23. The system of claim 19, wherein the second membrane module comprises:

a second pressure housing, the second pressure housing defining a second exterior surface of the second membrane module and including a second inlet configured to be fluidly coupled to the source of feed to be filtered by the system and a second outlet;

a fourth first membrane sub-unit defining a fourth cavity configured to removably receive a fourth plurality of membrane cartridges, the fourth plurality of membrane cartridges having a non-cylindrical profile; and a fifth membrane sub-unit defining a fifth cavity configured to removably receive a fifth plurality of membrane cartridges, the fifth plurality of membrane cartridges having a non-cylindrical profile;

wherein the fourth membrane sub-unit and the fifth membrane sub-unit are configured to be removably coupled together to define at least a portion of the second pressure housing; and wherein the second membrane module is fluidly coupled to the source of feed to be filtered by the system.

* * * * *